United States Patent
Momoh et al.

(10) Patent No.: US 6,684,230 B1
(45) Date of Patent: *Jan. 27, 2004

(54) SYSTEM AND METHOD FOR PERFORMING DEFINED ACTIONS WHEN GRAFTING THE NAME SPACE OF ONE STORAGE MEDIUM INTO THE NAME SPACE OF ANOTHER STORAGE MEDIUM

(75) Inventors: Oshoma Momoh, Seattle, WA (US); Luis Felipe Cabrera, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/433,448

(22) Filed: Nov. 4, 1999

Related U.S. Application Data

(63) Continuation of application No. 08/933,681, filed on Sep. 19, 1997, now Pat. No. 5,991,777.

(51) Int. Cl.$^7$ .............................................. G06F 17/30
(52) U.S. Cl. ...................................................... 707/205
(58) Field of Search ................................. 707/200, 205

(56) References Cited

U.S. PATENT DOCUMENTS

| | | | |
|---|---|---|---|
| 5,313,646 A | 5/1994 | Hendricks et al. | 707/101 |
| 5,355,497 A | 10/1994 | Cohen-Levy | 707/200 |
| 5,363,487 A | 11/1994 | Willman et al. | 710/8 |
| 5,423,034 A | 6/1995 | Cohen-Levy et al. | 707/10 |
| 5,590,320 A | 12/1996 | Maxey | 707/203 |
| 5,603,019 A | 2/1997 | Kish | 707/205 |
| 5,617,568 A | 4/1997 | Ault et al. | 707/101 |
| 5,689,701 A | 11/1997 | Ault et al. | 707/10 |
| 5,724,512 A | 3/1998 | Winterbottom | 709/226 |
| 5,758,334 A | 5/1998 | Knight, III et al. | 707/2 |
| 5,764,972 A | 6/1998 | Crouse et al. | 707/200 |
| 5,778,384 A | 7/1998 | Provino et al. | 707/200 |
| 5,905,990 A | 5/1999 | Inglett | 707/200 |

OTHER PUBLICATIONS

Teaff, Danny, Watson, Dick & Coyne, Bob, The Architecture of the High Performance Storage System (HPSS), High Performance of Storage Systems, www.esdis.gsfc.nasa.gov/msst/A4_1.html, no date.*

Storage Management, Products & Services, *DMIG/DMAPI FIX*, Web Site: www.auspex.com/products/storage/dmig.html, Oct. 1997.

(List continued on next page.)

*Primary Examiner*—Maria N. Von Buhr
(74) *Attorney, Agent, or Firm*—Workman, Nydegger

(57) ABSTRACT

The present invention allows arbitrary actions to be performed when grafting the name space of one device into the name space of the same or another device. Grafting of the name space of one device into the name space of the same or another device creates a logical name space that can be presented to the user to allow the user to access information in a logically consistent manner. Active mount points are created by adding an active mount point attribute to a file or directory. When an I/O request processed by an I/O system encounters an active mount point, it turns control for processing the active mount point over to an active mount point driver. The active mount point driver assumes responsibility for processing the I/O request. In processing the I/O request, the active mount point driver decides what action should be taken to further processing of the I/O request. To further processing of the I/O request, the active mount point driver may utilize information from a variety of sources as well as make requests to other processes, drivers, systems, subsystems, devices, and so forth. Such actions may include those normally associated with an I/O request such as retrieving and mounting appropriate media as well as actions not normally associated with an I/O request.

29 Claims, 7 Drawing Sheets

OTHER PUBLICATIONS

Patricia Seybold Group, *Distributed File Systems*, by Mitchell I. Kramer, Dec. 1996, Prepared for IBM Corporation and Transacr Corporation, www.transarc.com/afs/transarc.com/public/www/Public/ProdServ/Product/DFS/Seybold/dfs.html.

Kirk, Martin, *X/Open Distributed Systems Management Programme Overview*, May 1996, Distributed Systems Management Overview, www.xoweb.xopen.co.uk/public/tech/sysman/dsmbrief.htm.

SCO Distributed Systems Management–White Paper, Industry & Standards Efforts, ww.sco.com/products/baseos/family/sysmgt4.htm, no date.

Holton, Mike, Das, Raj, and Graphics, Silicon, Inc., *XFS: A Next Generation Journalled 64–Bit Filesystem with Guaranteed Rate I/O*, Silicon Graphics, 1995, XFS White Paper, www.sgi.fr/Technology/xfs–whitepaper.htm.

*ADSTAR Distributed Storage Manager—ADMS and HPSS Product Comparison*, IBM Storage Software, ADSM–Comparison with HPSS, Dec. 1996, www.storage.ibm.com/software/adsm/adwhhpss.htm.

*ADSTAR Distributed Storage Manager–Comparison With HPSS Frequently Asked Questions*, IBM Storage Software, updated Jan. 27, 1997, ADSM and HPSS Products Comparison FAW, www.storage.ibm.com/software/adsm/adhpss10.htm.

*ADSTAR Distributed Storage Manager Frequent Asked Questions*, IBM Storage Software, updated Apr. 25, 1997, ADSM—Frequently Asked Question (FAQ), www.storage.ibm.com/software/adsm/adfaq.htm.

*ADSTAR Distributed Storage Manager Product Overview Continued*, IBM Storage Software, updated Jul. 3, 1997, ADSM—Product Overview Continued, www.storage.ibm.com/software/adsm/adprov.htm.

*ADSTAR Distributed Storage Manager Basic Concepts*, IBM Storage Software, updated Oct. 31, 1997, ADSM Try and Buy—Basic Concepts, www.storage.ibm.com/software/adsm/adbasics.htm.

*ADSTAR Distributed Storage Manager Product Overview*, IBM Storage Software, ADSM Product Family Overview, www.storage.ibm.com/storage/adsm/ads0fam.htm, no date.

CAE Specification, Systems Management: Data Storage Management (XDSM) API, published by the Open Group, Feb. 1997.

Gulbins, J., "Unix", p. 227, Springer–Verlag, $3^{rd}$ edition, 1988.

Rao, H.C., "Towards a National Collaboratory: An Internet File System" ICSI '92, Proceeding of the Second International Conference On Systems Integration, Morristown, NJ, USA, Jun. 15–18, 1992, pp. 489–498, IEEE Comput. Soc. Press.

* cited by examiner

SYSTEM AND METHOD FOR PERFORMING DEFINED ACTIONS WHEN GRAFTING THE NAME SPACE OF ONE STORAGE MEDIUM INTO THE NAME SPACE OF ANOTHER STORAGE MEDIUM

CROSS-REFERENCE TO RELATED APPLICATIONS

This application is a continuation of a U.S. patent application Ser. No. 08/933,681, filed Sep. 19, 1997, and entitled "System and Method for Performing Defined Actions When Grafting the Name Space of One Storage Medium into the Name Space of Another Storage Medium", now U.S. Pat. No. 5,991,777 (issued Nov. 23, 1999), which is incorporated herein by reference in its entirety.

BACKGROUND OF THE INVENTION

1. The Field of the Invention

The present invention relates to systems and methods for grafting the name space of one storage medium into the name space of another storage medium. More specifically, the present invention allows actions to be performed without user or program intervention when the name space of one storage medium is grafted into the name space of another storage medium.

2. The Prior State of the Art

A functional computer system generally consists of three fundamental components. The first component is computer hardware, the second component is user or application programs, and the third component is an operating system. Computer hardware generally includes such devices as a central processing unit (CPU), system memory such as RAM and ROM, mass storage such as magnetic or optical disk storage, a keyboard or other input device, and a display or other output device. Users of computer systems generally interact with user or application programs. Such programs include familiar word processing applications, spreadsheet applications, database applications, and so forth. The computer operating system performs many functions such as allowing a user to initiate execution of an application program. In addition, modern operating systems also provide an interface between an application program and the computer system hardware. Thus, while it was once common place for an application program to directly access computer system hardware, modern operating systems provide standardized, consistent interfaces that allow user applications to interface with or access computer hardware in a standardized manner.

In order to provide a consistent interface between a process such as a user application and a particular type of hardware device, there may be several software layers between the actual hardware and the process. For example, a process may make a call into the operating system. The operating system, in turn, may utilize the services provided by a hardware driver layer. The hardware driver layer then interfaces directly with the hardware. A primary advantage of such a layered approach is that layers may be added or replaced without creating a huge impact on the remaining layers. For example, if a new hardware device is added to the system, a new driver may be added, which allows the operating system to access the hardware. All these changes may take place with minimal or no impact on existing application processes.

Many operating systems provide I/O subsystems that interface with various mass storage devices. Such I/O subsystems handle many details required to translate an I/O request into actions that must be performed to fill the I/O request. Many of these actions are necessitated by the required translation from a high-level concept such as retrieving information from a file into low-level actions such as positioning the read head over a particular location on a magnetic disk and retrieving information from that particular location.

In modern computer systems, data is typically stored on mass storage devices in a hierarchical fashion with directories and files organized in a hierarchy resembling a tree structure. The location of any file or directory is typically specified by a path name. The path name typically begins with a root or starting directory and names each subsequent subdirectory until the desired file or directory is reached. For example, a file called "file.dat" may be stored in a directory "temp" which is a subdirectory of the root directory "root\." To access file.dat an I/O request may include a path name, either explicitly or implicitly, which directs the I/O subsystem to a particular location in order to identify and access the appropriate file. The path name for file.dat would thus be \root\temp\file.dat.

When the I/O subsystem receives an I/O request with an associated path name, the path name must be resolved in order to allow translation to a particular location on a particular storage device so that the I/O request can be accomplished. Path names may be directly provided to the I/O subsystem or may be constructed based on known information. Resolving file names in a file system is typically a multi-stage procedure. It generally begins with a stage that decodes all of the named components that need to be successfully identified by the file system. The procedure then continues with an iterative process of identifying, usually from left to right, the successive name components of the path name. The procedure finishes with the success or failure of each of these name resolutions. Thus, in the example above, the path name would be broken down into successive components and the resolution process would identify, in turn, the root directory, the temp subdirectory, and the file file.dat.

With the proliferation of inexpensive powerful computers, many users and organizations are assembling networks of interconnected computers that utilize local area networks (LAN), wide area networks (WAN), or other networking technologies to allow individual users to share data and information. Often these networks of computers have multiple storage devices that can be accessed by multiple users. The result is that an individual user may have access to many different storage devices. As the number of storage devices and the hierarchy of directories and subdirectories on each storage device increases, users may have an increasingly difficult time finding and managing their data.

A volume is a storage unit that may be formatted with a file system and accessed via file system paths or devices names internal to the I/O subsystem. When multiple volumes, each with a hierarchy of directories and subdirectories, are available to a user, the user may have difficulty conceptually grasping the interrelationship between the directories and subdirectories of the individual volumes. This becomes a particular problem where large amounts of data that would naturally be organized according to a particular hierarchical structure are sufficiently large to prohibit the storing and organization of all related data on a single storage volume. In such a situation, it is generally necessary to store some data on one volume and other data on other volumes. Dividing such logically related data among multiple volumes adds to the confusion and difficulty felt by some users.

To overcome some of these limitations, mechanisms have been developed to present a logical view of the storage devices that is independent of the physical organization of the data on the storage devices. These mechanisms allow the name space of one storage device to be grafted into the name space of another storage device so that a single coherent, logical view may be presented to a user.

Referring now to FIG. 1, an example of such a grafting process is illustrated. In FIG. 1, two volumes 20 and 22 are illustrated. Volume 20 and volume 22 each have independent directory structures. The directory structure for volume 20 is illustrated generally as 24 and the directory structure for volume 22 is illustrated generally as 26. As used herein, directory structure and name space will be used interchangeably to identify the names or structures of directories and files on a particular volume. Although volume 20 and volume 22 each have individual directory structures, in this example it is desirable to present a single integrated directory structure to the user as illustrated by logical directory structure 28. Logical directory structure 28 illustrates that it is desirable to graft directory structure 26 into directory structure 24 at Dir4 30. When such a grafting takes place, logical directory structure 28 results.

Although many mechanisms may be used to graft the name space of one storage volume into the name space of another storage volume, one common technology is called a "mount point." A mount point is a name space location where another name space or directory structure should be mounted or grafted. Thus, in FIG. 1 Dir4 30 would be defined as a mount point. In FIG. 1 this is illustrated by dashed arrow 32. Conceptually, when mount point 30 is traversed, the file system accesses volume 22 instead of volume 20. For example, if the user is presented with logical directory structure 28, and a user wishes to access file.dat in Dir8, then the path to that file would be given as C:\Dir2\Dir4\Dir8\file.dat. When the file system resolves this path name, the file system will resolve the path name to Dir4 by accessing volume 20. Once Dir4 is accessed, however, the file system would recognize Dir4 as a mount point and continue the resolution process by accessing volume 22. In essence, a mount point traditionally acts as a sort of special directory which can redirect accesses to a location in the name space of another volume.

Although mount points are capable of creating a logical organization that is unrelated to the underlying physical storage structure, some problems may still exist. For example, if volume 22 of FIG. 1 was a removable storage device, then before the device could be accessed via logical directory structure 28, the removable media would need to be retrieved and mounted. Typically these steps are performed prior to presenting the user with logical directory structure 28. Such a retrieval and mounting process may be initiated, for example, by a user via the operating system or by a program that knows the device must be retrieved and mounted prior to access. Placing the burden of retrieving and mounting a removable volume on the user or on an application process yields several undesirable results. For example, users must be trained and know how to retrieve and mount the media. If the burden is placed on the application program, then each application program that wishes to retrieve and mount removable media must incorporate such functionality. This results in a great deal of redundancy and duplicated effort.

It would, therefore, be desirable to have a system which could present a logical directory structure to a user and eliminate the need for commands such as mounting and retrieval of removable storage media that must be executed before a user or application program tries to access the removable storage media. It would also be desirable to accomplish these functions without creating duplication of effort. It is further desirable to achieve this result without requiring the user to know how to retrieve and mount removable media.

SUMMARY AND OBJECTS OF THE INVENTION

The foregoing problems in the prior state of the art have been successfully overcome by the present invention, which is directed to a system and method for performing arbitrary actions when grafting all or part of the name space of one storage medium into the name space of the same or another storage medium. The present invention may be used to implement a wide variety of systems and achieve a wide variety of results. For example, when a mount point is traversed, the operating system may automatically retrieve and load the appropriate media before completing the I/O request. The present invention is robust enough to allow any arbitrary action to be performed when a mount point is traversed, even actions which are not normally associated with an I/O system or an I/O request.

The present invention provides an active mount point driver. This driver may be apart of the I/O subsystem of the operating system. When an I/O request is received that includes a path or file name, the path and file name is resolved in the traditional manner. If during the resolution process an active mount point is encountered, control is turned over to the active mount point driver. The active mount point driver may then take any action that is necessary in order to further completion of the I/O request. Once the active mount point driver has completed or initiated any desired actions that need to occur before the I/O request is complete, control may then be turned back over to the other components of the I/O subsystem for completion of the I/O request if the I/O request has not been completed by the actions of the active mount point driver.

In performing its actions, the active mount point driver may make use of a wide variety of system resources, processes, drivers, and the like. Once control is turned over to the active mount point driver, the active mount point driver may have access to all resources, processes, drivers, subsystems, and so forth of the system. If the system is networked or connected to other systems, then the active mount point driver may have access to those systems and any components, subsystems, processes, drivers, and the like associated with those systems. The structure defined by the present invention is robust enough to allow the active mount point driver to take whatever action is desired when an active mount point is encountered.

As one example of the capability of an active mount point, it is possible to develop and display to a user a directory hierarchy that integrates all CDs in a CD jukebox. A user wishing to access a particular CD would simply select the appropriate location in the directory structure. As the I/O system begins to resolve the path name to the CD, one or more active mount points can be encountered. These active mount points can, among other things, turn control over to the active mount point driver which can then issue commands to the CD jukebox to select and load the appropriate CD. Control may then be turned over to the I/O subsystem for completion of the I/O request. If the CD contains music, the active mount point driver may also issue commands to a multimedia subsystem to begin playing the CD once the CD has been mounted. Any other actions are also available when an active mount point is encountered.

Many mechanisms may be used to implement the system just described. Some important features are the ability to identify an active mount point and the ability to turn control over to the active mount point driver when an active mount point is encountered. The mechanism for making the transition should be efficient and provide for control to be returned from the active mount point driver if needed once the active mount point driver has completed the actions it is to perform. Additionally, when control is turned over to the active mount point driver, the active mount point driver must be able to identify or select which actions are to be taken. As explained in greater detail below, when deciding or selecting what actions should be completed the active mount point driver may gather other information from other sources or may turn control over to other drivers or processes to make those decisions. One embodiment of the present invention utilizes additional information stored with the mount point to achieve some of these functions.

In many systems, a directory or file may be viewed as a collection of different properties or attributes. Some common attributes for files are the name attribute, various flag attributes such as system, read-only, hidden, and the like, and a data attribute to store data. Some common attributes of directories are the name of the directory, possibly some security information, pointers or other mechanisms to identify the directories or files contained by this directory, and so forth. One embodiment of the present invention creates an active mount point by adding an additional attribute to a directory or file. When the directory or file is encountered during an I/O request, the I/O subsystem can identify the additional attribute and recognize the directory or file as an active mount point. Control may then be passed to the active mount point driver for further processing. The active mount point driver may retrieve information from a variety of sources, including one or more attributes of the directory or file. Based on this information, the active mount point driver may decide what action should be taken. Once the active mount point has completed its work, control may then be returned to the I/O subsystem for further processing.

The active mount point attribute may be added to both files and directories. The attribute is preferably additive in nature so that individual files and directories may be either be active mount points or not, depending upon the status of the active mount point attribute. An active mount point attribute preferably has both a tag and a data value. The tag is used to identify the active mount point driver that is the "owner" of the active mount point. In general, the owner of the active mount point is responsible for processing either all or part of an I/O request involving the active mount point. This structure allows multiple active mount point drivers to reside in a single system, each adapted to achieve different purposes. The data value of the active mount point attribute is stored in the active mount point attribute by the owner. Thus, an owner may use the value of the active mount point attribute to store any data that will be necessary or helpful to complete a particular I/O request that involves the active mount point. Such a data value may contain all information necessary to make decisions about what actions should be taken, or may contain pointers or other information that allows the active mount point driver to locate the information necessary to make a decision as to what action should be taken. The value of the active mount point may also identify other software entities that should be used to make the decisions as to what actions should be taken. In essence, since the value of the active mount point attribute is controlled by the owner, the owner can store any desirable information in the active mount point.

One embodiment of the present invention utilizes an I/O system having a plurality of layered drivers. The active mount point driver forms one of the layers of the I/O system. When an active mount point attribute is identified by a particular driver, the driver extracts the tag and the value of the active mount point. The I/O request, along with the tag and the value of the active mount point, is then passed to other of the layered drivers until one identifies itself as the owner of the active mount point. The owner then takes control and resumes processing the I/O request. The owner of the active mount point may completely process an I/O request, or may make use of other drivers, resources, information, processes, and the like to completely process the I/O request. In certain situations, the owner may also make use of other computers or systems to completely process the I/O request.

Because each active mount point has both a tag and a value, the active mount point mechanism provides an extremely flexible structure which may be used by any number of drivers to achieve any number of functions. An example of a system that automatically loads and mounts removable media has already been given. As another example, the active mount point may take actions not normally associated with an I/O system. For example, active mount points may be used to implement a secure file system which grafts the name space of files stored in a secure physical facility into a large directory hierarchy. When an individual accesses one of the secure files, control may be turned over to the active mount point driver. The active mount point driver may then initiate special validation procedures to determine whether the individual attempting to access the file has the authorization to do so. For example, the active mount point driver could initiate a separate challenge to the individual attempting to access the file. The active mount point driver may also send an email or other message to a security location notifying them that a certain individual was attempting to access the file. If the file is only allowed to be accessed during certain times or on certain days, the active mount point driver may check the date and time to determine whether access to the file is to be allowed. As seen by this example, an active mount point driver may take any number of actions based on information either directly available or that is accessed or obtained.

As a final example, utilizing the present invention it is possible to graft things into the name space of a storage device that traditionally could not be grafted into the name space of a storage device. For example, mount points have traditionally been used to graft the file system name space of one mass storage device into the file system name space of another mass storage device. With the present invention, however, it is possible to graft a non-file system name space, such as Internet or intranet web sites into the name space of a mass storage device. The Internet could be represented in the user interface by a special icon by supplying information from the active mount point to the user interface. When the user attempted to open the icon, the active mount point driver would create access to the Internet or other data provider and offer feedback on the content available through the data provider to the user via the user interface. As illustrated by the above examples, the present invention provides an extremely robust mechanism to allow arbitrary actions to be performed when grafting the name space of one device into the name space of another device.

Accordingly, it is a primary object of this invention to provide a system and method for performing arbitrary actions when the name space of one device is grafted into the name space of another device. It is another object of this invention to provide a system and method for performing these actions transparently to the user in order to reduce the amount of knowledge a user must possess to access certain devices or information from those devices. A still further object of the present invention is to provide a system and method that is extensible to situations not envisioned by the initial architects.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims. These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

The invention is described below by using diagrams to illustrate either the structure or processing of embodiments used to implement the system and method of the present invention. Using the diagrams in this manner to present the invention should not be construed as limiting of its scope. The present invention contemplates both methods and systems for the hierarchical storage of data. The embodiments of the present invention may comprise a special purpose or general purpose computer comprising various computer hardware, as discussed in greater detail below.

Embodiments within the scope of the present invention also include computer readable media having executable instructions or data fields stored thereon. Such computer readable media can be any available media which can be accessed by a general purpose or special purpose computer. By way of example, and not limitation, such computer readable media can comprise RAM, ROM, EEPROM, CD-ROM or other optical disk storage, magnetic disk storage or other magnetic storage devices, or any other medium which can be used to store the desired executable instructions or data fields and which can accessed by a general purpose or special purpose computer. Combinations of the above should also be included within the scope of computer readable media. Executable instructions comprise, for example, instructions and data which cause a general purpose computer, special purpose computer, or special purpose processing device to perform a certain function or group of functions.

Figure 2:
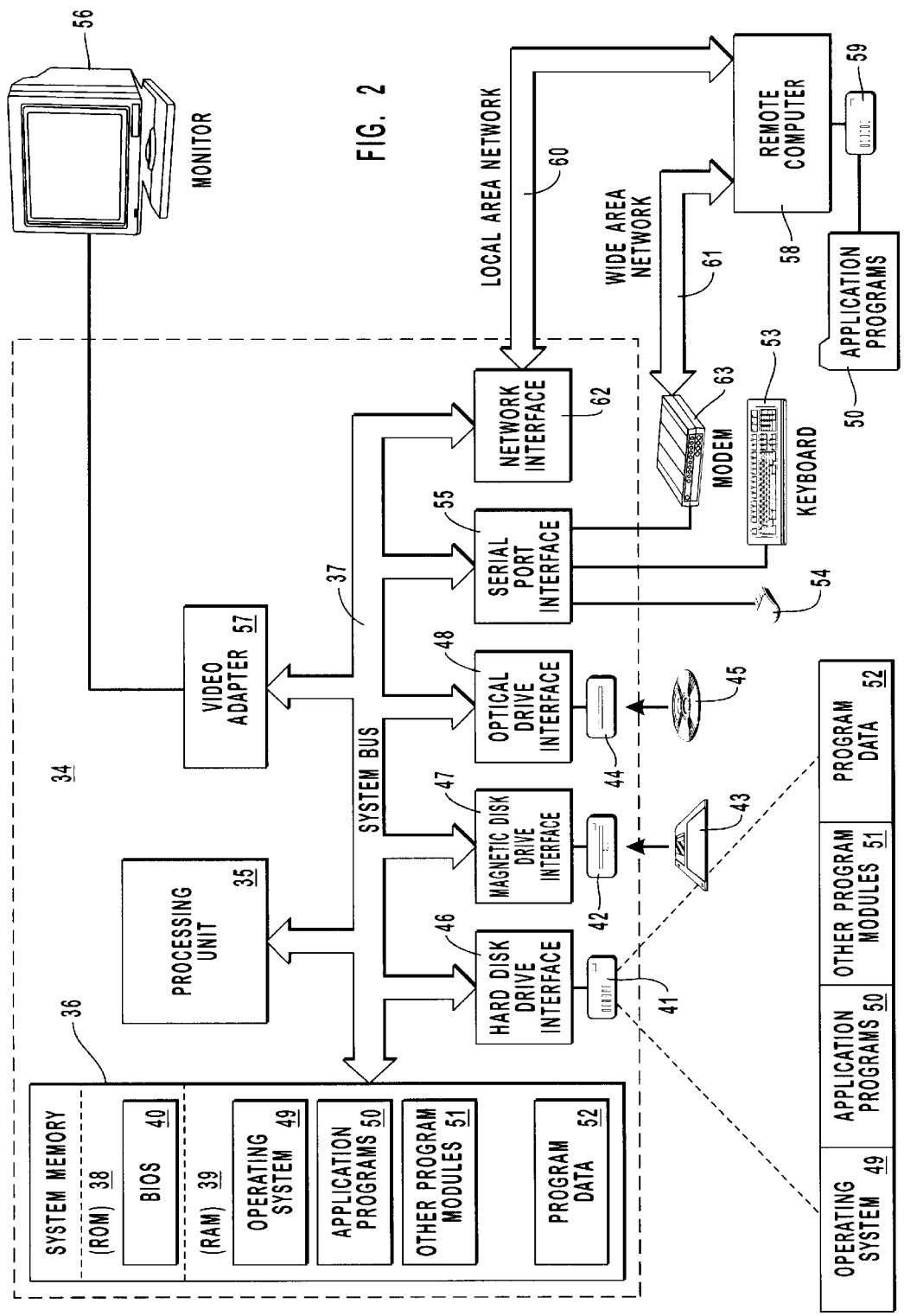
FIG. 2 is an example system that provides a suitable operating environment for the present invention.

FIG. 2 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 2, an exemplary system for implementing the invention includes a general purpose computing device in the form of a conventional computer 34, including a processing unit 35, a system memory 36, and a system bus 37 that couples various system components including system memory 36 to processing unit 35. The system bus 37 may be any of several types of bus structures including a memory bus or memory controller, a peripheral bus, and a local bus using any of a variety of bus architectures. The system memory includes read only memory (ROM) 38 and random access memory (RAM) 39. A basic input/output system (BIOS) 40, containing the basic routines that help to transfer information between elements within computer 34, such as during start-up, may be stored in ROM 38. Computer 34 may also include a magnetic hard disk drive 41 for reading from and writing to a magnetic hard disk, not shown, a magnetic disk drive 42 for reading from or writing to a removable magnetic disk 43, and an optical disk drive 44 for reading from or writing to removable optical disk 45 such as a CD-ROM or other optical media. Magnetic hard disk drive 41, magnetic disk drive 42, and optical disk drive 44 are connected to the system bus 37 by a hard disk drive interface 46, a magnetic disk drive interface 47, and an optical drive interface 48, respectively. The drives and their associated computer-readable media provide nonvolatile storage of computer readable instructions, data structures, program modules and other data for computer 34. Although the exemplary environment described herein employs a magnetic hard disk 41, a removable magnetic disk 43 and a removable optical disk 45, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 43, optical disk 45, ROM 38 or RAM 39, including an operating system 49, one or more application programs 50, other program modules 51, and program data 52. A user may enter commands and information into computer 34 through input devices such as a keyboard 53 and pointing device 54. Other input devices (not shown) may include a microphone, joy stick, game pad, satellite dish, scanner, or the like. These and other input devices are often connected to processing unit 35 through a serial port interface 55 that is coupled to system bus 37, but may be connected by other interfaces, such as a parallel port, game port or a universal serial bus (USB). A monitor 56 or other type of display device is also connected to system bus 37 via an interface, such as video adapter 57. In addition to the monitor, personal computers typically include other peripheral output devices (not shown), such as speakers and printers.

Computer 34 may operate in a networked environment using logical connections to one or more remote computers, such as remote computer 58. Remote computer 58 may be a personal computer, a server, a router, a network PC, a peer device or other common network node, and typically includes many or all of the elements described above relative to the computer 34, although only a memory storage device 59 has been illustrated in FIG. 2. The logical connections depicted in FIG. 2 include a local area network (LAN) 60 and a wide area network (WAN) 61 that are presented here by way of example and not limitation. Such networking environments are commonplace in offices enterprise-wide computer networks, intranets and the Internet.

When used in a LAN networking environment, computer 34 is connected to local network 60 through a network interface or adapter 62. When used in a WAN networking environment, computer 34 typically includes a modem 63 or other means for establishing communications over wide area network 61, such as the Internet. Modem 63, which may be internal or external, is connected to system bus 37 via serial port interface 53. In a networked environment, program modules depicted relative to computer 34, or portions thereof, may be stored in remote memory storage device 59. It will be appreciated that the network connections shown are exemplary and other means of establishing a communications link between the computers may be used.

Figure 3:
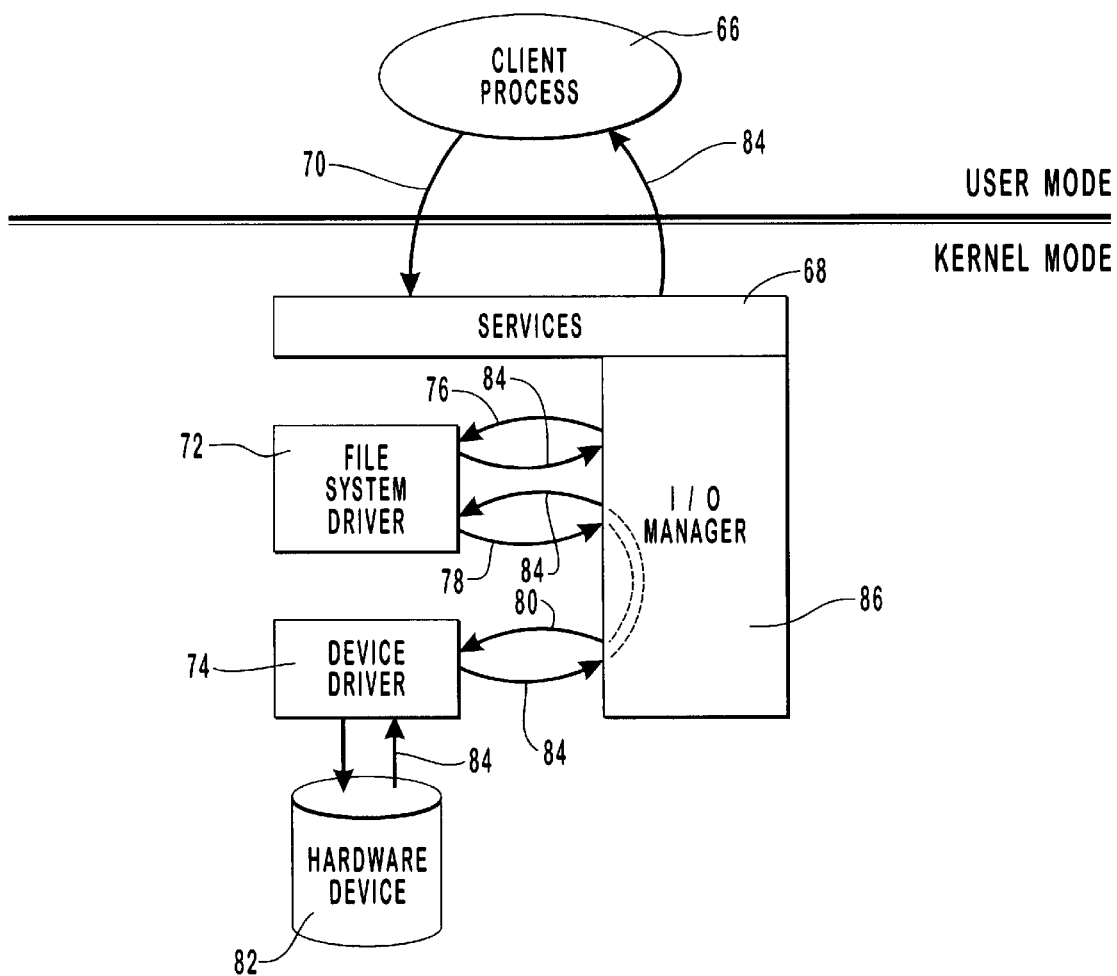
FIG. 3 is an example I/O system having a plurality of layered drivers.

Referring now to FIG. 3, a simplified diagram of the interaction between a client process and an operating system having an I/O system that uses a plurality of driver means for processing I/O requests is illustrated. This diagram is representative, for example, of the Microsoft Windows NT operating system. The diagram of FIG. 3 may also represent any operating system which uses a plurality of driver means for processing I/O requests. The use of layered driver means for processing I/O requests in an I/O system provides many benefits. One benefit provided by such an architecture is the ability to insert additional driver means tailored for specific purposes. As presented in greater detail below, one embodiment of the present invention may utilize such a layered architecture and may include an active mount point driver means as one of the layers in the I/O system. The following discussion of FIG. 3 is intended to provide a context for such an embodiment.

In FIG. 3, client process 66 makes use of operating system services 68 to perform I/O requests. This is typically achieved by client process 66 making a call to an application program interface (API) function provided by the operating system. Calling the appropriate API function ultimately results in a call to operating system services 68. Such a call is illustrated by arrow 70.

In FIG. 3, client process 66 is illustrated as operating in "user" mode and the operating system surfaces are illustrated as operating in "kernel" mode. Modem operating systems typically provide a robust environment for various application programs and intuitive user interfaces. Such operating systems normally have different operating levels or "modes," depending on the level of sophistication of the operating system and the security features that are implemented by the operating system. Normal application programs typically run at the lowest priority and have a full complement of security devices in place to prohibit interference with other applications, or with other layers of the operating system. Hardware and other services provided by the operating system are only accessed through controlled interfaces or mechanisms which limit the ability of a user application or other process in the user mode to "crash" the system. This lowest priority mode is typically referred to as user mode and is the mode that most computer users are familiar with. Because of the close integration of drivers with their associated hardware and because of the time critical nature of the tasks that many drivers perform, drivers typically run in an operating system mode that has a much higher priority and a much lower security protection. This mode is generally referred to as "kernel" mode. Placing the drivers and other operating system services in the kernel mode allows the operating system to run at a higher priority and perform many functions that would not be possible from user mode.

When client process 66 calls operating system services 68 in order to perform an I/O request, the I/O request is passed to a first driver means for processing I/O requests. In FIG. 3, file system driver 72 and device driver 74 represent examples of driver means for processing I/O requests. The passing of the I/O request to the first driver means is illustrated in FIG. 3, for example, by arrow 76. File system driver 72 will then take the I/O request and generally perform partial processing of the I/O request before passing the I/O request onto the next driver.

As an example, suppose client process 66 wished to open a particular file on disk and retrieve information from the file. The I/O request would pass from client process 66 to operating system services 68 and onto file system driver 72. File system driver 72 would then translate the I/O request from a file name to a particular location on a disk. The translation process may also include the number of data blocks that should be read from or written to the disk at the particular location. This information can then be passed to the next driver, as for example device driver 74. The process of passing the information required by device driver 74 is illustrated in FIG. 3 by arrows 78 and 80. Device driver 74 takes the location and number of the data blocks to be read or written and translates them to the appropriate control signals to retrieve the desired information from or store the desired information to hardware device 82. The data retrieved may then be passed from device driver 74 to file system driver 72 and ultimately back to client process 66 as indicated by return arrows 84. Status information may be returned in the same manner.

In FIG. 3, I/O requests are not passed directly between file system driver 72 and device driver 74. Rather, the I/O requests are passed between the drivers via I/O manager 86. It is, however, not necessary to have an I/O manager in all implementations. Embodiments may also exist where I/O requests are passed directly from one driver to another.

Figure 4:
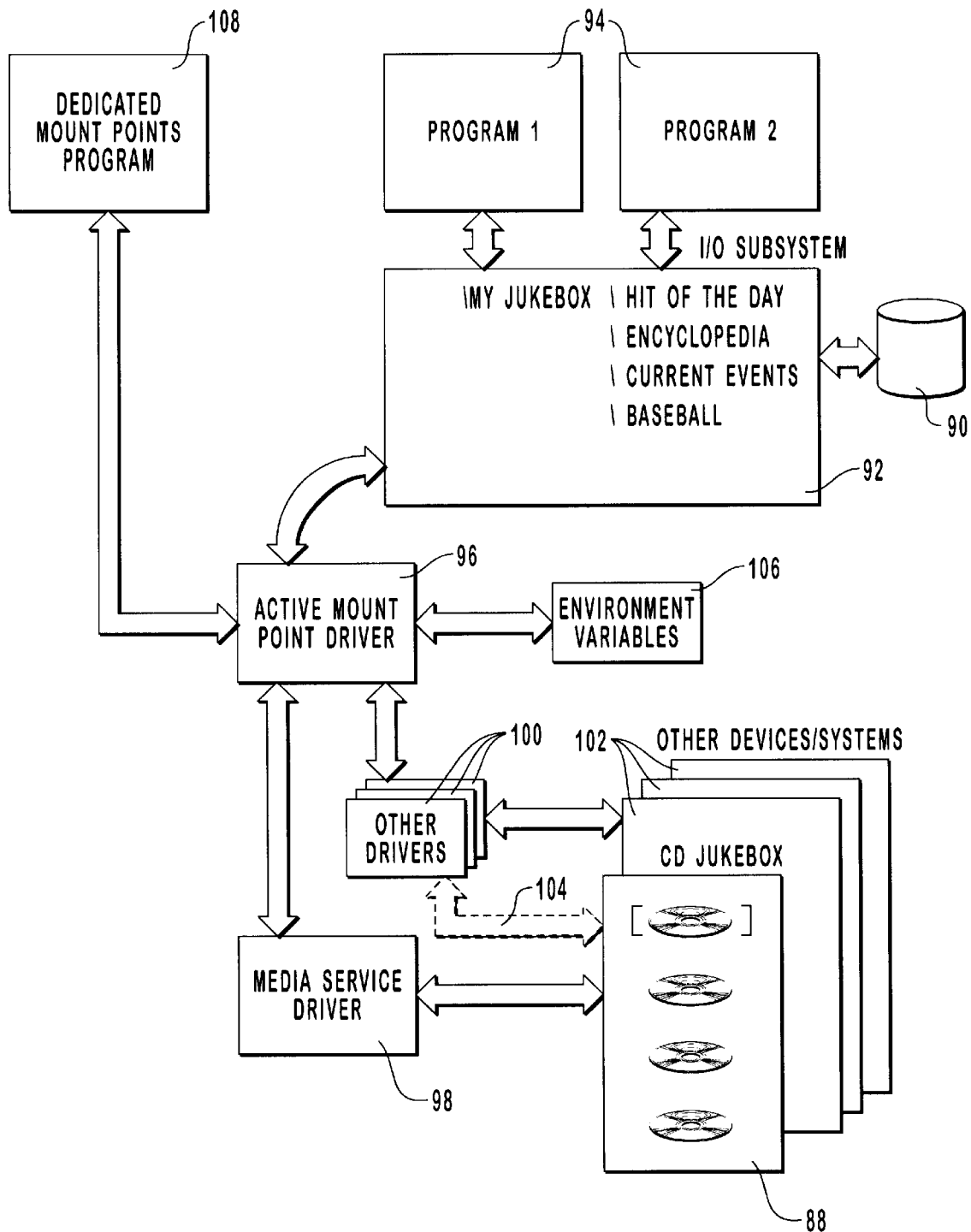
FIG. 4 is a high-level diagram of one embodiment of the present invention.

Referring next to FIG. 4, a high-level diagram of one embodiment of the present invention is illustrated. This embodiment illustrates some basic concepts of the present invention and is given by way of example and not limitation. Specifically, the embodiment illustrates some basic concepts relating to active mount points. A mount point is a name space location where another name space or directory structure should be mounted or grafted. A mount point acts as a junction into the grafted name space. Active mount points allow actions to be taken when traversing into the grafted name space. In this invention, mount points can be used to provide a junction from the name space of one device into all or part of the name space of another device. Additionally, mount points can be used to provide a junction within a single device from one portion of the name space to a different portion of the name space. Thus, although examples may illustrate grafting the name space of one device into another device, the same principles apply when grafting a portion of the name space of a device into a different portion of the name space of the device.

In the embodiment illustrated in FIG. 4, a CD jukebox 88 is loaded with a series of CDs. The I/O subsystem using active mount point technology has grafted the name space of the individual CDs into the overall name space of another hardware device, such as hardware device 90. A partial representation of the logical name space that results from the grafting process is illustrated in FIG. 4 as 92. In this example, a directory "my jukebox" has four subdirectories, each representing a CD in CD jukebox 88. In FIG. 4, these CDs are illustrated as "Hit of the Day," "Encyclopedia," "Current Events," and "Baseball." The logical name space may be made available to a variety of user mode programs such as program 1 and program 2 illustrated in FIG. 4 as 94.

User mode programs 94 may be any programs that make I/O requests from the I/O subsystem. For example, one of the user mode programs may be a program that displays the logical name space to a user such as the Microsoft Windows Explorer program. Such a program allows a user to traverse the logical name space and perform various functions on the directories or files. One such action is the initiation of program execution. In this example, perhaps a user wished to access one of the CDs in CD jukebox 88. The user may perform such an action by activating the corresponding name displayed to the user. The process of activating the name would then initiate an I/O request to the I/O subsystem using the path name of the appropriate device.

For purposes of this example, presume that the Hit of the Day CD is a music CD, and the Encyclopedia CD, the Current Events CD, and the Baseball CD are data CDs. In the case of the Current Events CD further presume that the CD could access an on-line data service to provide updates to the information on the Current Events CD. As a first example, suppose the user activated the Hit of the Day CD. When the I/O request is passed to the I/O subsystem, the I/O subsystem would begin resolving the path name associated with the I/O request. The I/O system would retrieve information, for example, from hardware device 90 during the resolution process. When the Hit of the Day name was checked on hardware device 90, the I/O subsystem would recognize that an active mount point had been traversed. Information in the active mount point stored on hardware device 90 could then be extracted and control could be passed to active mount point driver 96. Active mount point driver 96 would recognize that the user was attempting to access the Hit of the Day CD and take appropriate action. In this case, active mount point driver 96 may use media service driver 98 to load the Hit of the Day CD in CD jukebox 88. Once the Hit of the Day CD is loaded in CD jukebox 88, active mount point driver 96 may take steps to automatically play the Hit of the Day CD. Such steps may require use of media service driver 98 and/or a separate audio rendering driver and associated hardware. This is illustrated in FIG. 4, for example, by other drivers 100 and other devices/systems 102. Direct access to CD jukebox 88 by these drivers is illustrated by dashed arrow 104. The mechanisms used by active mount point driver 96 to load a CD is an example of means for mounting media. If media service driver 98 is part of that process, then media service driver 98 may form part of such means.

As another example, suppose the user accessed the Current Events CD. As before, when the I/O subsystem traversed the active mount point associated with the CD, control would be passed to active mount point driver 96. Active mount point driver 96 would utilize media service driver 98 to load the appropriate CD. In this case, however, active mount point driver 96 may also take steps to access the on-line data service to provide updates to the user.

In the previous examples, active mount point driver 96 was able to determine what action to take based on information provided by the I/O subsystem. In other situations, active mount point driver 96 may need to rely on other information, drivers, processes, systems, and the like to provide either information or decision making capability. In FIG. 4, for example, active mount point driver 96 may receive information from environment variables 106. Environment variables 106 represents information available on the system such as the time and date, the current CD loaded by CD jukebox 88, or any other type of information. Such environment variables may also be provided by the I/O subsystem as part of the information passed to mount point driver 96. When active mount point driver 96 needs other drivers, processes, systems, and the like to help make decisions as to what action should be performed, control may be passed or information may be solicited from an appropriate device or component.

In FIG. 4, active mount point driver 96 may access other devices 102 through other drivers 100. In addition, active mount points driver 96 may turn control over to or receive direction or information from an associated process, such as dedicated mount points program 108. Although program 108 is illustrated as a dedicated mount points program, active mount points driver 96 may make use of programs or processes not exclusively dedicated to active mount points processing. The logic within any of these entities that helps make decisions regarding the action or actions taken when an active mount point is encountered is an example of means for selecting an action.

In FIG. 4, active mount point drivers 96, media service driver 98, and other drivers 100 are all examples of driver means for processing I/O requests. In FIG. 4, active mount points driver 96 may be part of the I/O subsystem, may be part of a different subsystem, or may be its own software subsystem, depending upon the implementation.

Figure 5:
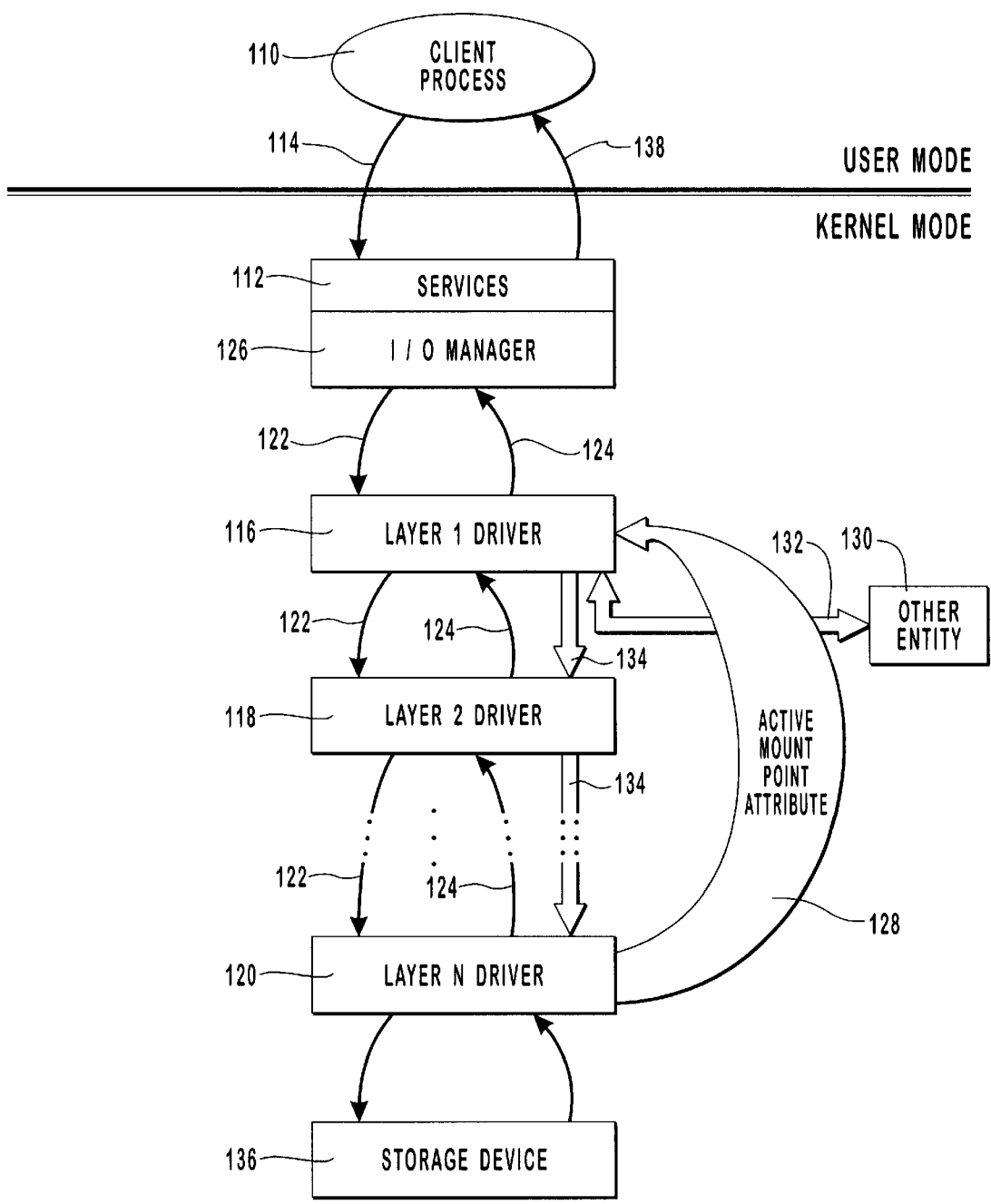
FIG. 5 is a diagram illustrating the passing of control to a particular driver when a special attribute is encountered.

As illustrated in the embodiment of FIG. 4, control is transferred from one driver to the active mount points driver when an active mount point is encountered. Embodiments within the scope of this invention may, therefore, comprise means for transferring control for processing a received I/O request from a first driver means to a second driver means. Referring next to FIG. 5, the basic concepts of an example of one mechanism used to implement such means is presented. FIG. 5 may represent, for example, a top-level conceptual diagram illustrating an I/O system that utilizes a plurality of driver means for performing I/O processing. Client process 110 makes an I/O request that is eventually forwarded to operating system services 112 as illustrated by arrow 114. The I/O system illustrated in FIG. 5 comprises a plurality of driver means for performing I/O processing. By way of example, and not limitation, in FIG. 5 such driver means are illustrated by layer 1 driver 116, layer 2 driver 118, and layer N driver 120.

Because I/O requests are passed between drivers, embodiments within the scope of this invention may comprise means for passing I/O requests from one driver means to another. By way of example, in FIG. 5 such means is illustrated by arrows 122 and 124 which illustrate I/O requests being passed directly from one driver to another. Such a means may also comprise an I/O manager which handles the transferring of I/O requests from one driver to another. Such an I/O manager may be I/O manager 126 of FIG. 5. Other combinations may also be used. Essentially, any mechanism that allows an I/O request to be transferred from one driver means to another may be appropriate for use as a means for passing I/O requests from one driver means to another.

In FIG. 5, I/O manager 126 forwards an I/O request received from client process 110 to layer 1 driver 116. Such an I/O request may be in the form of a function or service that is called by the I/O manager or any other mechanism which transfers the appropriate information to the appropriate driver. In Microsoft Windows NT, for example, a message driven mechanism is used to communicate between the various drivers of the I/O system. In this system, an I/O request results in the I/O manager creating an I/O request packet (IRP) and sending the IRP to the appropriate driver. As the I/O requests are processed and forwarded to other drivers, information may be added to the IRP and the IRP passed to the next driver. In addition, a new IRP may be created and sent to the next driver. In certain circumstances, the IRP may be modified or "transmogrified" before being passed onto the next driver. In Microsoft Windows NT, the I/O manager is responsible for transferring IRPs between drivers. In other systems, other mechanisms may be used. Such implementation details are considered to be design choices and are not critical to the invention.

Returning now to FIG. 5, the I/O request is forwarded through the various drivers as indicated by arrows 122, with each driver performing any required processing before forwarding the I/O request onto the next driver. Note that although FIG. 5 illustrates each driver receiving the I/O request in turn, in some embodiments it may be desirable to skip certain drivers so that only those drivers that are needed to process the I/O request actually handle the I/O request.

In one embodiment of the present invention, when a plurality of drivers are used to perform I/O processing, a mechanism exists for interrupting the normal sequence of processing an I/O request when a file or directory with an active mount point attribute is encountered. Control is then passed to another driver to decide how the I/O request associated with the active mount point should be processed. Embodiments within the scope of the present invention may, therefore, comprise means for interrupting processing of an I/O request. In FIG. 5, such means may be incorporated, for example, into layer N driver 120. In this embodiment of the invention, the normal sequence of processing is interrupted when a file or directory is encountered that has an active mount point attribute.

When an active mount point attribute is recognized, the normal sequence of processing the I/O request is suspended and steps are taken to complete the processing of the I/O request. The steps involve transferring control for processing the I/O request to a different driver in order to allow the driver to participate in the processing of the I/O request for the active mount point. Embodiments within the scope of this invention may therefore comprise means for transferring control for processing a received I/O request from one driver means to another driver means. Any mechanism which transfers control from a driver processing the I/O request to another driver, when the processing of the I/O request identifies an active mount point may be utilized. In FIG. 5, such a mechanism is illustrated, for example, by arrow 128 which shows control for processing the I/O request being transferred from layer N driver 120 to layer 1 driver 116 when an active mount point is encountered during the processing of an I/O request. As explained in greater detail below, the mechanism for transferring control from one driver to another may also transfer certain information so that the driver assuming control can properly process the I/O request involving the reparse point. Thus, embodiments within the scope of this invention may also comprise means for passing information from one driver to another.

Figure 1:
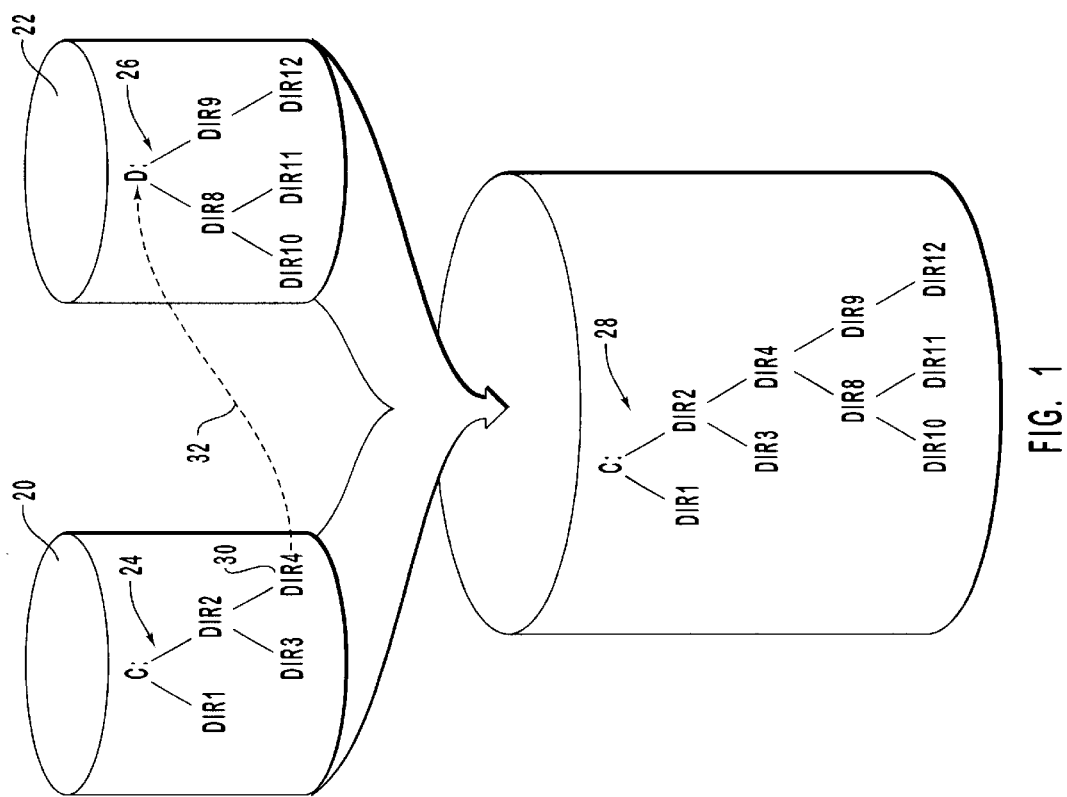
FIG. 1 is a diagram illustrating the grafting of the name space of one device into the name space of another device.

In the embodiment illustrated in FIG. 1, layer 1 driver 116 represents the active mount point driver which is responsible for processing I/O requests involving active mount points. Once layer 1 driver 116 assumes control, layer 1 driver 116 may take any appropriate action to further the processing of the I/O request involving the active mount point. Some examples of actions that may be taken have been previously discussed in conjunction with FIG. 4 and elsewhere. The embodiment in FIG. 5 represents a simplified embodiment where layer 1 driver 116 may utilize other entities to perform certain actions that should be completed while processing an I/O request. In FIG. 5 these entities are represented, for example, by other entity block 130. Arrow 132 represents control and information that passes between layer 1 driver 116 and other entity 130. Other entity 130 may represent, for example, other drivers, other systems, various data sources or data pipes, user mode or kernel mode processes, system services, and so forth. Layer 1 driver 116 may also utilize any of the previous drivers as illustrated by arrows 134. Arrows 134 may also represent, for example, control being returned to normal I/O processing once layer 1 driver 116 has performed any active mount point actions that should be initiated or completed before processing of the I/O request is resumed by the I/O subsystem. When an I/O request is completed, results may be returned to the client process as indicated by arrow 138.

It should be noted that layer N driver 120 recognized when an active mount point was encountered on storage device 136. The details of active mount point attributes and how they are part of a file or directory is presented in greater detail below. It is important to realize that active mount points may be encountered at any point in the I/O processing of an I/O request. In general, however, such mount points will be encountered during the name resolution process, as previously described. Furthermore, if multiple mount points are used in a directory hierarchy to graft multiple name spaces into a single logical name space, the active mount points may be encountered on devices that have been accessed through previous mount points. In other words, the name resolution process may lead from one storage device to a second storage device where an active mount point is encountered when further resolving the path name.

In modern operating systems, files and directories can be thought of as simply a collection of "attributes." An attribute, at its most abstract level, is simply a data storage location. Different attributes are used to identify different properties of a file or a directory or are used to hold different types or quantities of information that allows the operating system and other processes that must deal with the file or directory to know certain information about the file or directory. For example, a file may contain a name attribute which allows processes to identify the file, and a data attribute which contains the data stored in the file. A file can have any number of other attributes, such as security attributes indicating who can access the file and in what manner, a time stamp attribute, attributes that identify which directory the file is stored in, and so forth. Directories may contain similar sorts of attributes, although directories do not typically contain a data attribute where a user can store a large amount of data. Certain embodiments of the present invention identify active mount points by adding an active mount point attribute to a file or directory. Although such an attribute may be added to either a file or directory, mount points are typically thought of as a special type of directory which links to the name space of another device. However, for completeness, the present invention will refer to adding an active mount point attribute to either a file or directory.

Figure 6:
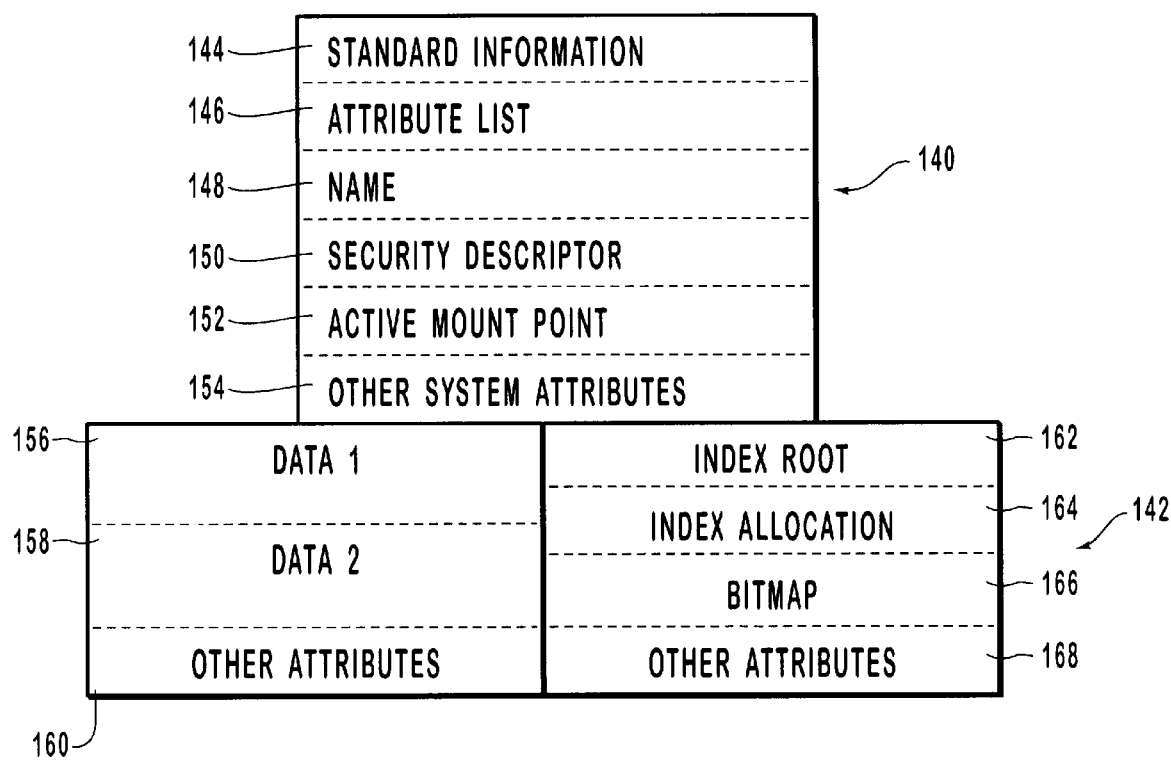
FIG. 6 is a list of attributes suitable for use with the present invention.

Referring now to FIG. 6, a pictorial diagram of attributes for either a file or directory suitable for use with the present invention is illustrated. These attributes represent a modified list of attributes used by the NTFS file system developed specifically for Microsoft Windows NT. The NTFS file system is described in greater detail in *Inside the Windows NT File System*, by Helen Custer, published by Microsoft Press and incorporated herein by reference. In FIG. 6, the attributes that make up a file or directory may be divided into two fundamental groups. The first fundamental group, illustrated generally as 140, represents attributes that are common to both files and directories. The second fundamental group, illustrated by 142, contains attributes specific to a file (shown on the left) or a directory (shown on the right). FIG. 6 is given by way of example, and not limitation, and any collection of attributes used by a system may be suitable for use with the present invention as along as the information stored in an active mount point attribute can be identified and retrieved by the appropriate driver.

Attributes 140 comprise standard information attribute 144, attribute list 146, name attribute 148, security descriptor attribute 150, active mount point attribute 152, and other system attributes 154. Standard information attribute 144 represents the standard "MS-DOS" attributes such as read-only, read/write, hidden, and so forth for a file, the time stamp of the file or directory, and how many directories point to the file. Attribute list 146 is an attribute used by NTFS to identify the locations of additional attributes that make up the file or directory should the file or directory take up more than one storage record in the master file table. The master file table is the location where all resident attributes of a file or directory are stored. Name attribute 148 is the name of the file or directory. A file or directory may have multiple name attributes in NTFS, for example, a long name, a short MS-DOS name, and so forth. Security descriptor attribute 150 contains the data structure used by Windows NT to specify who owns the file or directory and who can access it. These attributes are described in greater detail in *Inside the Windows NT File System*.

Active mount point attribute 152 is a new attribute added by the present invention. Active mount point attribute 152 identifies a particular file or directory as an active mount point requiring special processing by a particular driver. The active mount point attribute preferably contains sufficient information to allow two objectives to be achieved. The first objective is that the particular driver which should process the active mount point (the active mount point's owner) must be able to be identified. In addition, for maximum flexibility, it is preferable that the owner of the active mount point be able to store data associated with the active mount point that can later be used by the owner to correctly process the active mount point. Further information regarding the active mount point will be given below. Other system attributes 154 represents any other system attributes stored with the file or directory.

The file attributes of group 142 comprises data attributes 156 and 158 and other attributes 160. A file typically has one or more data attributes. Data attributes 156 and 158 represent locations where user controlled data may be stored. Files in most systems comprise a single data attribute. In NTFS, however, multiple data attributes are allowed. In NTFS, a file has one unnamed attribute while all the remaining data attributes are named data attributes. More information regarding data attributes can be found in *Inside the Windows NT File System*. Other attributes 160 represents other user attributes that are created and stored by a user or a user process. These attributes can be used for any function desired by a user.

Directory attributes may comprise, for example, index route attribute 162, index allocation attribute 164, bitmap attribute 166, and other attributes 168. Although more information regarding these attributes can be found in *Inside the Windows NT File System*, previously incorporated herein by reference, essentially index route attribute 162 contains indexes to the files contained by the directory, index allocation attribute 164 contains information regarding data block or "cluster" mappings, and bitmap attribute 82 keeps track of which clusters are in use and which are free. Other attributes may also be defined and stored as part of a directory, as indicated by other attributes 168.

Although the above discussion has gone into some detail with regards to a particular type of file or directory, such should be construed as exemplary only and not as limiting the scope of this invention. The present invention will work with any type of file or directory that has an active mount point added to the existing attributes of the file or directory. In the alternative, it may also be possible to utilize existing attributes to store the active mount point attribute information and hence, equivalently, provide a way to include an active mount point attribute without increasing the existing number of attributes in the file or directory.

Figure 7:
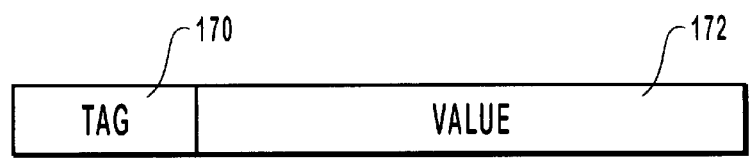
FIG. 7 is a diagram of one embodiment of an active mount point attribute.

Active mount point attribute 152 stores information that allows a mount point to be identified and, preferably, processed by the owner of the mount point. Thus, any combination of information that allows these goals to be accomplished can be used for active mount point attribute 152. One embodiment uses a reparse point attribute as an active mount point attribute. More information regarding reparse point attributes and how they can be used to interrupt the processing of an I/O request and transfer control to another driver for processing can be found in U.S. patent application Ser. No. 08/239,593, entitled FILE SYSTEM PRIMITIVE ALLOWING REPROCESSING OF I/O REQUESTS BY MULTIPLE DRIVERS IN A LAYERED DRIVER I/O SYSTEM (hereinafter the "reparse point application"), incorporated herein by reference. Referring next to FIG. 7, the basic structure of an attribute suitable for use as an active mount point attribute is presented. The active mount point attribute illustrated in FIG. 7 comprises tag 170 and value 172.

Because an active mount point is processed by a particular driver, embodiments within the scope of this invention comprise means for identifying a particular driver as the owner of the active mount point. Any mechanism which identifies a particular driver as the driver that should process at least part of an I/O request involving the active mount point can be used for such a means. If the active mount point has the structure illustrated in FIG. 7, such means may comprise, for example, tag value 170. In the active mount point illustrated in FIG. 7, tag 170 is a data word that contains the ID of the owner of the active mount point. Tags must be assigned in a manner that allows the owner of the active mount point to be identified. Any mechanism that assigns tags in such a fashion can be utilized. For example, tags may be assigned so that the same tag is always associated with the same owner driver no matter which system the driver is installed on. For example, there may be a central repository or clearing house which assigns blocks of tag values to various driver manufacturers. The driver manufacturers can then assign tags to specific drivers. Any other mechanism that allows tag values to be associated with at most a single driver can also be used. Alternatively, it may be possible to assign local tag values in a dynamic way so that tag values are assigned by the system during installation of the driver. Any mechanism that allows the owner of an active mount point to be identified can be used to assign tag values.

The active mount point illustrated in FIG. 7 also contains an owner controlled value field 172. Owner controlled value 172 represents a location where the owner of the active mount point may place any type of information needed to properly process the active mount point. For example, the owner can insert information that allows decisions to be made about what action should be taken when the active mount point is encountered. In the alternative, information may be stored in value 172 that allows the owner to identify other locations where information should be obtained or what other drivers, systems, subsystems, and so forth should make decisions regarding actions that should be taken to process the active mount point.

Although not illustrated in FIG. 7, value 172 may be preceded by a data length indicator. In this storage format, the length of the data field is stored to ascertain how much data must be read to complete the value. Alternatively, in some embodiments it may be more efficient to store a value of a fixed length or a value that utilizes blocks of information chained together through pointers or links. Essentially, any mechanism that identifies how much data must be read to complete the value filed can be utilized. Consideration should also be given to how much data may need to be stored by an owner driver. Such considerations will influence how the data field is stored and the maximum possible length of the data field.

Figure 8:
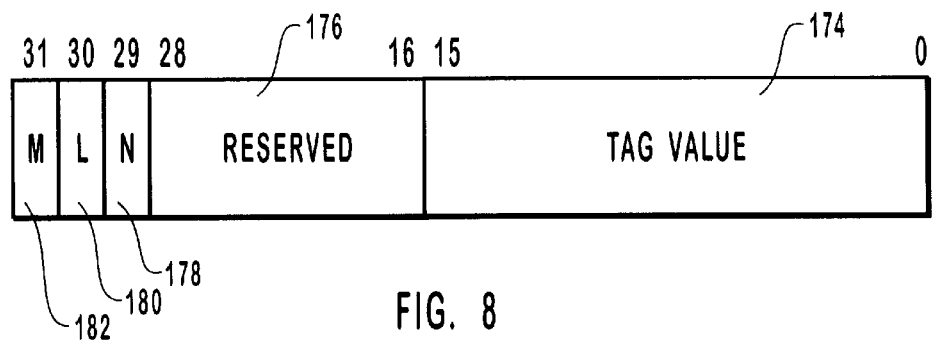
FIG. 8 is a diagram illustrating one embodiment of the tag of an active mount point attribute.

Referring now to FIG. 8, a more detailed illustration of one embodiment of tag 170 of FIG. 7 is presented. In the embodiment of FIG. 8, tag 170 is a 32-bit word. Various types of information are encoded into the word as illustrated in FIG. 8. Basically, the tag of FIG. 8 is divided into three distinct areas. Bits 0–15 are allocated to tag value 174. These bits are available to companies creating drivers to assign a unique tag value that will identify their driver as the owner of the active mount point. As previously explained, such values may be assigned by a central authority or they may dynamically assigned by the system using various procedures and protocols. As long as a driver can identify an active mount point as owned by it, any mechanism to assign tag values 174 may be utilized. Bits 16–28 comprise reserved field 176. These bits are reserved for future use. Bit 29, illustrated in FIG. 8 as 178, is a name surrogate flag. When this bit is set, the file or directory represents another named entity in the system. This allows a file or directory to act as a surrogate for another named entity.

Bit 30, illustrated in FIG. 8 as 180, is a high-latency bit. When set to 1, a file or directory with this tag is expected to have a long latency to retrieve the first byte of data. As previously explained, the present invention may be used to graft the name space of any device into the name space of any other device. In some situations, when a user or program accesses the grafted portion there may be a high latency from the time when the request is made until the time the first data byte is returned. Such a situation may be encountered, for example, when an active mount point must retrieve media from a storage location, mount the media on a device, and position the media so data can be read. This would be the case, for example, when a tape silo was grafted into the name space of another device. Similar situations may arise when data providers, such as the Internet or other network is grafted into the name space of a device. In order to retrieve data from the Internet, an active mount point may be required to establish a connection over a dial-up line. This may introduce sufficient latency to warrant setting the latency bit.

Bit 31, illustrated in FIG. 8 as 182, is reserved to indicate that the owner of the active mount point is Microsoft. When set, other drivers may be assured that the owner driver is a Microsoft driver. Including this flag allow the operating system to quickly sort tags associated with internal drivers and allows others to quickly sort drivers that do not belong to them. The structure illustrated in FIG. 8 may also be suitable for use with the reparse point attribute described in the reparse points patent application, previously incorporated by reference.

Figure 9:
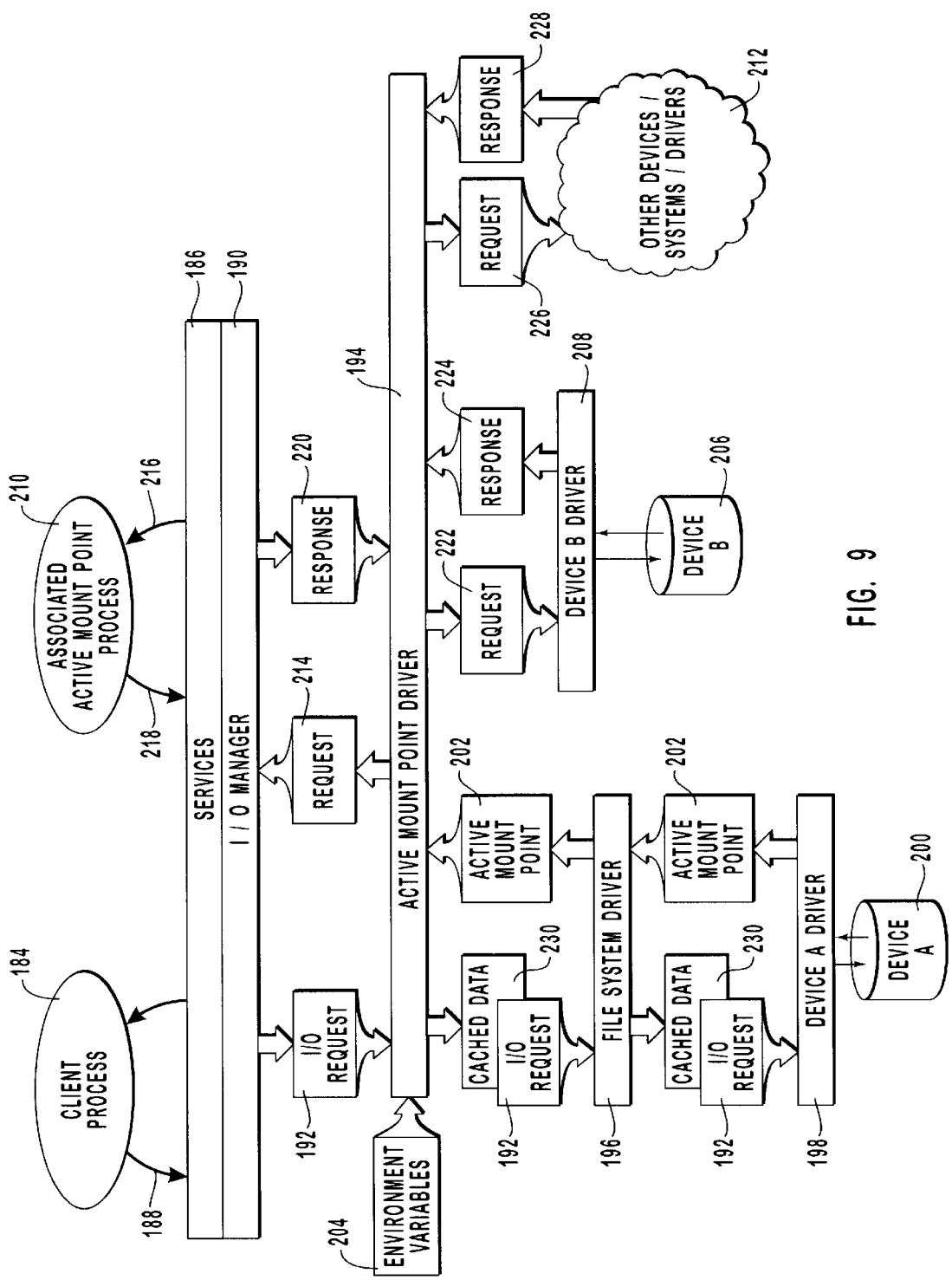
FIG. 9 is a high-level diagram of another embodiment of the present invention.

Referring next to FIG. 9, a more detailed diagram of one embodiment of the present invention is presented. In this embodiment, client process 184 initiates an I/O request by making a call to system services 186 as illustrated by arrow 188. I/O manager 190 will forward I/O request 192 to the drivers of the I/O subsystem. In FIG. 9, I/O request 192 is seen as being passed between active mount point driver 194, file system driver 196, and device driver 198. As previously mentioned, however, in some embodiments I/O request 192 may only be routed to certain drivers that are directly involved in the particular I/O request. I/O request 192 may be any mechanism of passing a particular I/O request between drivers. Such mechanisms may comprise direct function calls, messages, and other mechanism. If the I/O system is part of Windows NT, I/O request 192 may be incorporated into an IRP as previously explained.

If an active mount point is encountered during processing of the I/O request, device driver A will recognize that the directory or file on device A 200 has an associated active mount point attribute. Upon detection of the active mount point attribute, device A will extract appropriate active mount information and return the information to the next layered driver. This process is illustrated in FIG. 9 by active mount point information 202. Active mount point 202 will comprise, for example, the tag and, possibly, the value of the active mount point encountered by device driver 198.

When file system driver 196 receives active mount point information 202, it will recognize it as an active mount point. If file system driver 196 is so configured, file system driver 196 may check the tag to ensure that it is not responsible for processing the active mount point. In this example, however, active mount points are processed by active mount point driver 194. Thus, file system driver 196 would pass active mount point information 202 to the next higher layer driver. If other drivers resided between active mount point driver 194 and file system driver 196, each driver would receive active mount point information 202 and have an opportunity to examine the tag in order to identify whether it should assume responsibility for processing the active mount point.

Eventually, however, active mount point driver 194 will receive active mount point information 202. It will then recognize itself as the owner of the active mount point and take appropriate steps to accomplish whatever actions are required to further completion of the I/O request. For example, if the active mount point is grafting the name space of a removable media device, then active mount point driver 194 may need to generate a new request to have the appropriate media located, selected, mounted, and positioned for reading or writing. Active mount point driver 194 may then issue and I/O request to complete I/O request 192 initiated by client process 184. If active mount point 194 is required to mount media and position the media for an I/O operation, embodiments may comprise means for mounting media. Such a means may be any mechanism used by active mount point driver 194 to mount appropriate media on an appropriate device. CD jukeboxes, tape silos, and the like all have interfaces that need to be activated in order to achieve these functions. Typically, active mount point driver 194 will access these functions through another driver or system.

Because active mount point driver 194 will determine what action needs to occur when an active mount point is encountered, active mount point driver 194 may have means for selecting an action. Such means may be any mechanism that allows active mount point driver 194 to determine what action or actions should be initiated or completed to further the processing of the I/O request from client process 184. As previously mentioned, in order to determine what actions may be taken, active mount point driver may utilize various drivers, information sources, processes, systems, subsystems, and the like. Various of these items are illustrated in FIG. 9. For example, information may be obtained from various environment variables, such as environment variables 204. Environment variables 204 represents any source of information regarding the environment where active mount points driver 194 operates. Such environment variables may include various system level information such as the date and time, hardware configuration of the system, or any other information about the operating environment or system. In addition to obtaining information from environment variables 204, information may also be obtained from other sources such as device B 206 associated active mount points process 210, or other devices, systems, drivers 212.

In addition to providing information, other devices, systems, drivers, associated processes and so forth may also take part in the decision making process. Thus, means for selecting an action may include other devices, systems, drivers, associated processes, and so forth. In such a situation, active mount point driver 194 would make a request or turn control over to the appropriate entity, and receive whatever response or result was generated by that entity. Thus, means for selecting an action may reside not only in active mount driver 194 but also in other entities throughout the system or network where the invention operates. Communicating with associated active mount point process 210 is represented by request 214, arrow 216, arrow 218, and response 220. Communication with device 206 via device driver 208 is illustrated by request 222 and response 224. Communication with other devices, systems, and drivers are illustrated by request 226 and response 228. It will be appreciated by those of skill in the art that active mount point driver 194 may utilize any type of mechanism available for one software component to call or access another software component when using other entities to achieve a desired function. Such calls or accesses may be local or may be remote across networks or other communication enterprises as previously explained.

FIG. 9 illustrates an additional aspect of the present invention. This aspect can be explained by considering a scenario where active mount point driver 194 accesses a remote data source, such as a remote disk, other storage media or data from a data pipe, such as the Internet or an intranet. In such a situation, when a user wishes to access information from the remote location, an active mount point can be utilized to graft the name space of the remote device into the name space of a local device. The user can then access the data transparently without taking any special action to access the remote data. In such a situation, it may be desirable to create a local cache of remote data in order to speed up subsequent accesses to the remote data. For example, perhaps active mount point driver 194 retrieved various remote data that a user had accessed or that active mount point driver anticipated that the user would access in the near future. This information could then be cached on a local storage device in order to provide quicker access to the data on the next access. This process is illustrated in FIG. 9 by cached data 230 being written to device A 200. After the data has been cached, when an active mount point is encountered, it may be possible for active mount point driver 194 to retrieve the information from device A 200 rather than incur the latency necessary to retrieve the data from the remote location. Embodiments incorporating this feature may comprise means for caching data accessed from a first device so that the information can be retrieved without future access to the first device.

In summary, this invention provides a robust mechanism to perform arbitrary actions when the name space of one device is grafted into the name space of another device. The invention uses the concept of an active mount point which allows the system to perform any desired action when the active mount point is traversed. Such actions may include not only actions traditionally associated with I/O requests such as reading or writing of data, mounting of media, and so forth, but also actions not normally associated with I/O requests such as sending email, initiating execution of a process, mounting and playing of an audio CD, or any other type of action that may be initiated or completed in the system via software. The mechanism is robust enough to allow extension to scenarios not envisioned by its original designers without undo impact on current implementations.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method of performing arbitrary actions when grafting at least a portion of a name space of a first volume into a name space of a second volume accessed through a processing device, said method comprising the steps of:

defining an active mount point in the name space of said second volume that grafts at least a portion of the name space of said first volume into the name space of said second volume, said active mount point having associated therewith a quantity of information;

when said processing device processes an I/O request involving a name containing said active mount point then performing at least the following steps:
retrieving said quantity of information associated with said active mount point;
examining said quantity of information associated with said active mount point; and
initiating an action based on at least said quantity of information in order to further completion of said I/O request.

2. A method of performing arbitrary actions when grafting at least a portion of a name space of a first volume into a name space of a second volume as recited in claim 1 where both said first volume and said second volume are the same device so that said active mount point grafts a portion of the name space of the device into another location in the name space of the same device.

3. A method of performing arbitrary actions when grafting at least a portion of a name space of a first volume into a name space of a second volume as recited in claim 1 further comprising the step of examining information from other sources prior to initiating said action.

4. A method of performing arbitrary actions when grafting at least a portion of a name space of a first volume into a name space of a second volume as recited in claim 1 further comprising the step of receiving information from an executing process prior to initiating said action.

5. A method of performing arbitrary actions when grafting at least a portion of a name space of a first volume into a name space of a second volume as recited in claim 1 further comprising the step of presenting a representation of the integrated name spaces of the first volume and the name space of the second volume to a user.

6. A method of performing arbitrary actions when grafting at least a portion of a name space of a first volume into a name space of a second volume as recited in claim 1 further comprising the step of changing information displayed to a user through a user interface based on said quantity of information associated with said active mount point.

7. A method of performing arbitrary actions when grafting at least a portion of a name space of a first volume into a name space of a second volume as recited in claim 1 wherein said action comprises the displaying of information to a user.

8. A method of performing arbitrary actions when grafting at least a portion of a name space of a first volume into a name space of a second volume as recited in claim 1 wherein said action is different from said I/O request.

9. A method of performing arbitrary actions when grafting at least a portion of a name space of a first volume into a name space of a second volume as recited in claim 1 further comprising the step of completing said I/O request after initiating said action.

10. A method of performing arbitrary actions when grafting at least a portion of a name space of a first volume into a name space of a second volume as recited in claim 1 wherein said second volume is a magnetic storage disk and when said I/O request accesses information on said first volume, said information is copied to said second volume.

11. A method of performing arbitrary actions when grafting at least a portion of a name space of a first volume into a name space of a second volume as recited in claim 1 wherein said first volume is at least one of either an FTP service or an HTTP service and wherein said active mount point grafts said first volume into the name space of said second volume.

12. A method of grafting at least a portion of a name space into a name space location of a volume accessed through a processing device, said method comprising the steps of:
receiving an I/O request comprising a path name characterized by at least one name component and having at least one active mount point associated therewith, said active mount point comprising a quantity of information;
resolving said path name beginning with a starting name component such that each successive name component of said path name is identified and checked against the name space of said volume, said resolution continuing until said active mount point is encountered;
when said active mount point is encountered then suspending the resolution process and performing at least the following steps:
retrieving said quantity of information associated with said active mount point; and
initiating an action different from the I/O request based on at least said quantity of information.

13. A method of grafting at least a portion of a name space into a name space location of a volume as recited in claim 12 wherein said action comprises retrieving and mounting media so that said media can be accessed.

14. A method of grafting at least a portion of a name space into a name space location of a volume as recited in claim 12 wherein said action comprises retrieving information from a data source.

15. A method of grafting at least a portion of a name space into a name space location of a volume as recited in claim 12 wherein said action comprises sending email.

16. A method of grafting at least a portion of a name space into a name space location of a volume as recited in claim 12 further comprising the step of continuing said resolution step when said action is complete and the step of completing said I/O request.

17. A method of grafting at least a portion of a name space into a name space location of a volume as recited in claim 12 further comprising the step of presenting to a user a representation of the integrated name spaces of a first volume and a second volume.

18. A method of grafting at least a portion of a name space into a name space location of a volume as recited in claim 12 further comprising the step of retrieving information from other sources prior to initiating said action.

19. A method of grafting at least a portion of a name space into a name space location of a volume as recited in claim 12 further comprising the step of retrieving information from a computer system.

20. A method of grafting at least a portion of a name space into a name space location of a volume as recited in claim 12 wherein said active mount point provides a junction into a name space of a second volume.

21. A method of grafting at least a portion of a name space into a name space location of a volume as recited in claim 12 wherein said active mount point provides a junction into a name space of the same volume.

22. A method of performing arbitrary actions when grafting at least a portion of a name space of a first volume into a name space of a second volume accessed through a processing device, said method comprising the steps of:
defining an active mount point in the name space of said second volume that grafts at least a portion of the name space of said first volume into the name space of said second volume, said active mount point comprising a tag and a value each stored on said second volume, said tag identifying an active mount point driver;

initiating an I/O request with said processing device involving said active mount point;

prior to completion of said I/O request, an active mount point driver assuming responsibility for processing said I/O request;

said active mount point driver examining said value of said active mount point; and said active mount point driver initiating an action to further completion of said I/O request.

23. A method of performing arbitrary actions when grafting at least a portion of a name space of a first volume into a name space of a second volume as recited in claim 22 wherein said action is different from said I/O request.

24. A method of performing arbitrary actions when grafting at least a portion of a name space of a first volume into a name space of a second volume as recited in claim 23 further comprising the step of sending information to a user interface for display to a user.

25. A method of performing arbitrary actions when grafting at least a portion of a name space of a first volume into a name space of a second volume as recited in claim 24 further comprising the step of displaying to a user the integrated name space of said first volume and said second volume.

26. A method of performing arbitrary actions when grafting at least a portion of a name space of a first volume into a name space of a second volume as recited in claim 25 further comprising the step of completing the I/O request.

27. A method of performing arbitrary actions when grafting at least a portion of a name space of a first volume into a name space of a second volume as recited in claim 26 wherein said I/O request accesses information on said first volume.

28. A method of performing arbitrary actions when grafting at least a portion of a name space of a first volume into a name space of a second volume as recited in claim 27 further comprising the step of caching information accessed on said first volume so that the cached information can be retrieved without accessing said first volume.

29. A method of performing arbitrary actions when grafting at least a portion of a name space of a first volume into a name space of a second volume as recited in claim 28 wherein said cached information is stored so that the cached information can be retrieved from said second volume.

* * * * *